United States Patent Office 3,357,659
Patented Dec. 12, 1967

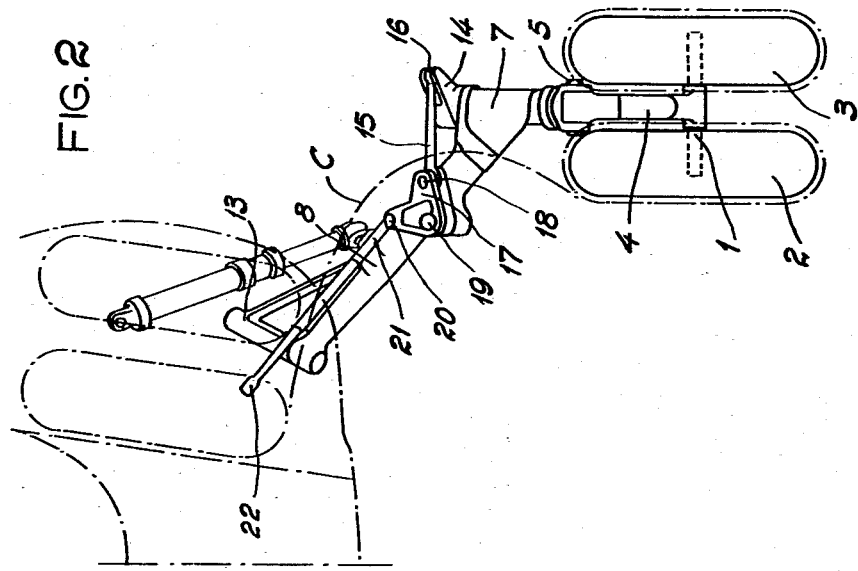
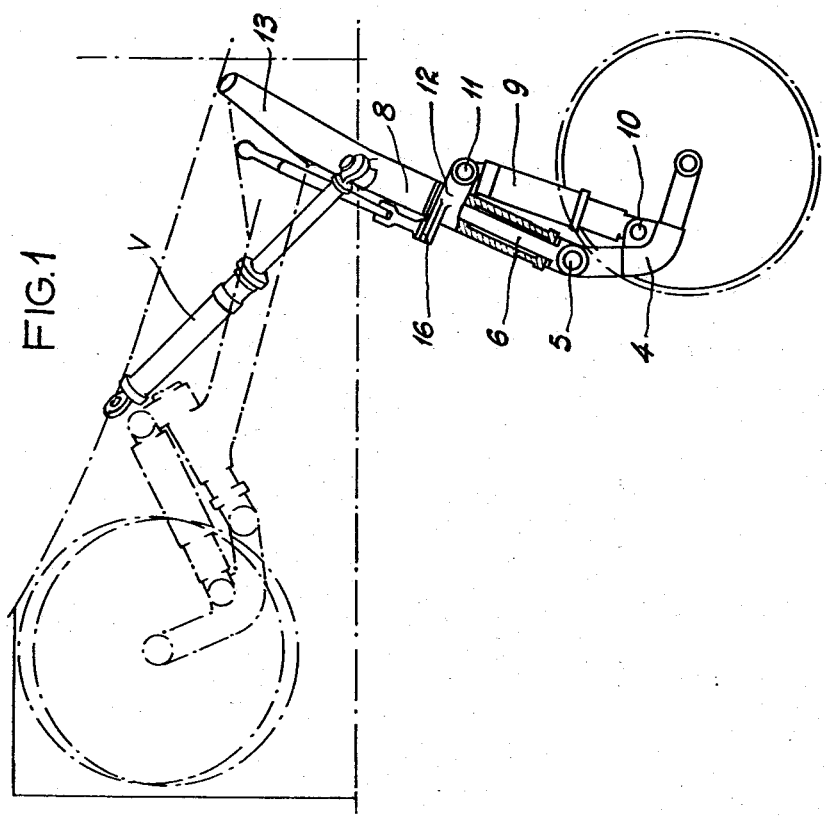

3,357,659
RETRACTION DEVICES FOR FUSELAGE UNDER-
CARRIAGES WITH WHEELS ARRANGED IN DIA-
BOLO MOUNTING
Rene Lucien, Neuilly-sur-Seine, France, assignor to
Recherches Etudes Production R.E.P.
Filed Feb. 3, 1966, Ser. No. 524,784
Claims priority, application France, Apr. 16, 1965,
13,654
6 Claims. (Cl. 244—102)

ABSTRACT OF THE DISCLOSURE

A lifting system for a fuselage undercarriage in which a leg casing is articulated on a hinge housed in the cavity of the fuselage and disposed obliquely with respect to the horizontal and with respect to the longitudinal plane of symmetry of the fuselage, a shaft being mounted pivotally with respect to the leg casing and supporting a pivotal rocking lever which in turn carries a common axle for wheels mounted in Diabolo. The shaft is parallel to the plane of symmetry in the undercarriage-down position, and when the undercarriage is retracted the shaft on the one hand pivots outwardly to an angle of about 90° with respect to the leg casing and hinge, and on the other hand the leg casing pivots through an angle of about 90° with respect to the hinge such that the wheels undergo a total pivotal movement of 180° with respect to said hinge during the course of the extending and retracting movement of the undercarriage. The pivotal movement of the shaft with respect to the leg casing and hinge is effected by a crank arm hingeably mounted on the leg casing and connected to the fuselage by a link and to the shaft by another link such that the shaft undergoes rotation relative to the casing as the wheels are retracted.

---

The present invention relates to retraction devices for fuselage undercarriages with wheels arranged in Diabolo mounting.

When it is not possible to fix the landing gear under the wings of an aircraft, either because the wings are too high or are not thick enough or because their geometry is variable, use is made of so-called "fuselage undercarriages," that is to say undercarriages such that the landing gear, in the raised position, is retracted and becomes completely housed in the fuselage, in which is also provided the articulation hinge which enables it to be lifted.

In order that the retracted wheels of such fuselage undercarriages may occupy a minimum space, it would be sufficient for the articulation hinge to be perpendicular to the plane of symmetry of the aircraft, but in the undercarriage-down position, the track, that is to say the distance between the right-hand undercarriage and the left-hand undercarriage would then be too narrow to ensure adequate stability of the aircraft.

It is obviously possible to give the articulation hinge a judicious inclination to the central plane of the aircraft, but the result of this is generally that the articulation hinge is then pushed back towards the exterior of the fuselage, in which the wheels then become housed obliquely, which has the effect of increasing the space required for their housing.

The invention has for its object a system of lifting fuselage undercarriages with wheels arranged in Diabolo mounting, which does not possess these serious drawbacks, that is to say in which the articulation hinge of each undercarriage is housed inside the fuselage, and in which the track in the undercarriage-down position is sufficiently wide to ensure perfect stability of the aircraft.

In principle, the invention consists:

(1) Of choosing for the undercarriage an articulation hinge arranged in such manner that, with respect to the central plane of the aircraft and to the lifting system of the undercarriage, the angle which necessarily exists in the undercarriage-down position, looking to the front, between the leg which is oblique and the moving system comprising the wheels and the shock-absorber, the latter being perpendicular to the ground, is again found in the undercarriage-up position, in a plane substantially parallel to the plane of symmetry of the aircraft;

(2) Of causing the entire moving system to pivot towards the exterior, during lifting, about an axis which is parallel in the undercarriage-down position to the plane of symmetry of the aircraft, so that in the undercarriage-up position, the wheels have pivoted substantially through an angle of 180° so that they thereby become substantially parallel to the longitudinal central plane of the aircraft.

In consequence, a lifting system for a fuselage undercarriage with wheels arranged in Diabolo mounting is characterized in that the undercarriage is articulated on the fuselage by an articulation hinge housed in the interior of the said fuselage and inclined towards the ground and towards the plane of symmetry of the aircraft in a forward direction, the moving system comprising the wheels, the rocking lever carrying the common axle of the wheels, and the undercarriage shock-absorber being pivotally mounted on the leg casing along an axis which, in the undercarriage-down position, is parallel to the plane of symmetry of the aicraft, means being provided to ensure the lifting of the undercarriage and to cause the casing of the gear, during retraction, to pivot simultaneously through an angle of approximately 90 degrees with respect to the fuselage, and the wheel axle to pivot through an angle of approximately 90 degrees with respect to said casing, so that, when retraction is completed, the wheels will have pivoted through approximately 180 degrees with respect to their initial position.

With such a lifting system for the fuselage undercarriage, the housing of the landing-gear has a minimum width and height since, when the undercarriage is retracted, all the elements of the structure of the landing-gear are in substantially the same vertical plane and are disposed at the lower portion of the fuselage as a result of the pivotal movement of the wheels.

It will be noted that the lifting system according to the invention has the advantage that by a judicious choice of the relative positions of the various members of the undercarriage, the envelope of the trajectory of each of the wheels of the Diabolo is a curve having its concavity turned towards the plane of symmetry of the aircraft, which permits any desired load to be fitted under the fuselage of the aircraft without any interference with the wheels of the landing-gear during the course of their lifting.

In one preferred form of embodiment of the invention, a lever controlling the pivotal axis of the wheels will be articulated through the intermediary of a crank-arm on the extremity of a pivoted lever mounted to oscillate on the leg casing, the other extremity of the lever being coupled by a crank-arm to the structure of the aircraft, these various members occupying relative positions such that the pivotal movement takes place automatically during the course of lifting the undercarriage, and that in the undercarriage-down position, the articulation of the lever controlling the pivotal shaft on the crank-arm which couples it to the said pivoted lever, and the articulations of the said pivoted lever on this crank-arm and on the leg casing are in alignment so as to ensure a locking effect on the whole moving system during the course of its rotation about the pivotal shaft.

This form of construction of the lifting system according to the invention will be described below by way of non-limitative example, with reference to the accompanying drawings. These drawings only show the left-hand undercarriage of fuselage landing-gear with wheels arranged in Diabolo mounting, the right-hand undercarriage being deduced therefrom by symmetry.

FIG. 1 is a profile view of the landing-gear.

FIG. 2 is a front view of the same landing-gear.

In each of these figures, the undercarriage is shown in the "down" position (full lines), and in the "retracted" position (chain-dotted lines).

The axle 1 common to the two wheels 2 and 3 of the undercarriage is mounted on a rocking lever 4, articulated at 5 on the lower extremity of a tube 6, pivotally mounted inside a sleeve 7 which forms part of the leg casing 8. In the undercarriage-down position, the tube 6 is parallel to the plane of symmetry of the aircraft.

A shock-absorber 9 is coupled to the rocking-lever 4 by a shaft 10 and to the tube 6 by means of a shaft 11 and a support 12.

The leg casing 8 is articulated on the aircraft by a lifting hinge 13, inclined towards the ground and towards the plane of symmetry of the aircraft, in the forward direction of the latter.

A lever 14 forming part of the support 12 controls the rotation of the tube 6.

A crank-arm 15 is articulated on the lever 14 by a shaft 16 and to a pivoted crank-lever 17 by a shaft 18. The crank-lever 17 is mounted so as to oscillate on the leg casing 8 by means of a shaft 19. Another extremity of the crank-lever is articulated at 20 to a crank-arm 21 coupled to the aircraft by a shaft 22 located outside the hinge 13.

The geometry of this crank system is chosen in such manner that, with the undercarriage-down, the points 16, 18 and 19 are in alignment, which ensures the locking in rotation about the axis of the tube 6, of the whole of the moving system.

The retraction of the undercarriage is effected in conventional manner by a jack V connected at one end to the fuselage and at an opposite end to the leg casing 8.

During the course of lifting, as the point of attachment of the crank-arm 21 is not on the hinge 13, there is produced a rocking movement of the crank-lever 17 which causes a rotation of the moving system about the axis of the tube 6 through the intermediary of the crank-arm 15 and the lever 14. As shown in the drawings, at the end of the lifting movement, the wheels have thus pivoted automatically with respect to the sleeve 7 and are thus substantially parallel to the plane of symmetry of the aircraft. They thus occupy a minimum space in the fuselage. In addition, the whole structure of the landing-gear is housed in the lower part of the fuselage, the upper part together with the space which separates the wheels from the plane of symmetry being thus left free and can be occupied by an air sleeve or by parts of the aircraft.

As indicated above, the envelope C of the trajectory of the inner wheel 2, which represents the locus of the points on the inner wheel closest to the fuselage is a curve which has its concavity turned towards the plane of symmetry of the aircraft, so that a load can be disposed under the fuselage without this interfering with the undercarriage during the course of its movement of retraction.

It is clear that the system which automatically controls the pivotal movement of the tube 6 and the wheels during the course of lifting could be replaced by an independent system of another type, for example by a jack articulated on the leg casing and on the lever 14, without thereby departing from the scope of the invention.

What I claim is:

1. A lifting system for a fuselage undercarriage with wheels arranged in Diabolo mounting, said system comprising a lifting hinge, a leg casing articulated on said hinge, a shaft mounted pivotally with respect to said leg casing, a rocking lever articulated on said shaft, a common axle for wheels mounted in Diabolo, said axle being mounted on the rocking lever, said fuselage having a longitudinal plane of symmetry and an internal cavity in which the undercarriage is retractable, said hinge being housed in the cavity of said fuselage and disposed obliquely with respect to the horizontal and with respect to the longitudinal plane of symmetry thereof, said shaft being parallel to said plane of symmetry in the undercarriage-down position, means for extending and retracting the undercarriage, and means for causing said shaft on the one hand to pivot outwardly through an angle of about 90° with respect to the leg casing and on the other hand the leg casing and hinge to pivot through an angle of about 90° with respect to said hinge such that the wheels undergo a total pivotal movement of 180° with respect to said hinge during the course of the extending and retracting movement of the undercarriage, the latter said means comprising a crank arm hingeably mounted on said leg casing and means connected to said crank arm and to the shaft and fuselage to cause rotation of the shaft relative to the casing as the wheels are retracted and extended.

2. A system as claimed in claim 1 comprising a shock absorber jack articulated on said shaft and on said rocking lever.

3. A system as claimed in claim 2, wherein said casing includes a sleeve in which said shaft is pivotably mounted.

4. A lifting system as claimed in claim 3, in which said means for extending and retracting the undercarriage leg comprises a jack articulated on said leg casing and on said fuselage, and the means connected to said crank arm and to the shaft and fuselage for causing the pivotal movement of said shaft relative to the leg casing comprises a lever fixed to said shaft, a first crank-arm articulated to said lever, said crank-lever being articulated at one of its extremities to said first crank-arm, and a second crank-arm articulated to the other extremity of said crank-lever and to the fuselage.

5. A lifting system as claimed in claim 4, in which, in the undercarriage-down position, the articulation of said lever on said first crank-arm, the articulation of said crank-lever on said first crank-arm and the articulation of said crank-lever on said leg casing are in alignment.

6. A lifting system as claimed in claim 5, wherein said articulations have relative positions such that the envelope of the trajectory of the wheel nearest to the longitudinal plane of symmetry of the fuselage is a curve, the concavity of which is turned towards said plane of symmetry so as to be able to house a load under said fuselage without said load interfering with the undercarriage during the course of the lifting movement.

References Cited

UNITED STATES PATENTS

| 2,272,699 | 2/1942 | Gladden | 244—104 |
| 2,896,884 | 7/1959 | Perdue | 244—102 |
| 2,974,909 | 3/1961 | Perdue | 244—102 |
| 3,038,687 | 6/1962 | Hartel | 244—102 |
| 3,086,733 | 4/1963 | Hartel | 244—102 |

FOREIGN PATENTS

| 860,432 | 2/1961 | Great Britain. |
| 1,006,522 | 10/1965 | Great Britain. |

FERGUS S. MIDDLETON, *Primary Examiner.*

MILTON BUCHLER, *Examiner.*

P. E. SAUBERER, *Assistant Examiner.*